C. B. THWING.
GRAPHIC RECORDER.
APPLICATION FILED AUG. 26, 1911.
1,046,680.
Patented Dec. 10, 1912.
2 SHEETS—SHEET 2.
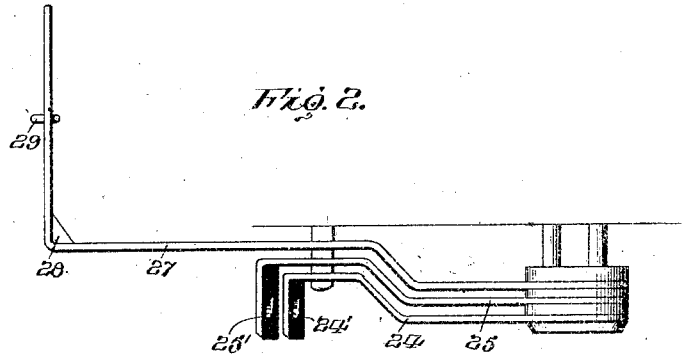
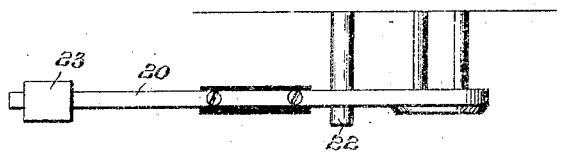
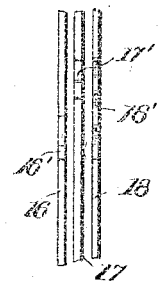
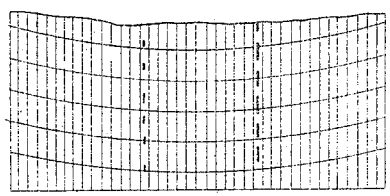
WITNESSES
G. F. Baker
J. T. Walker
INVENTOR,
Charles B. Thwing
by W. B. Corwin,
Attorney.

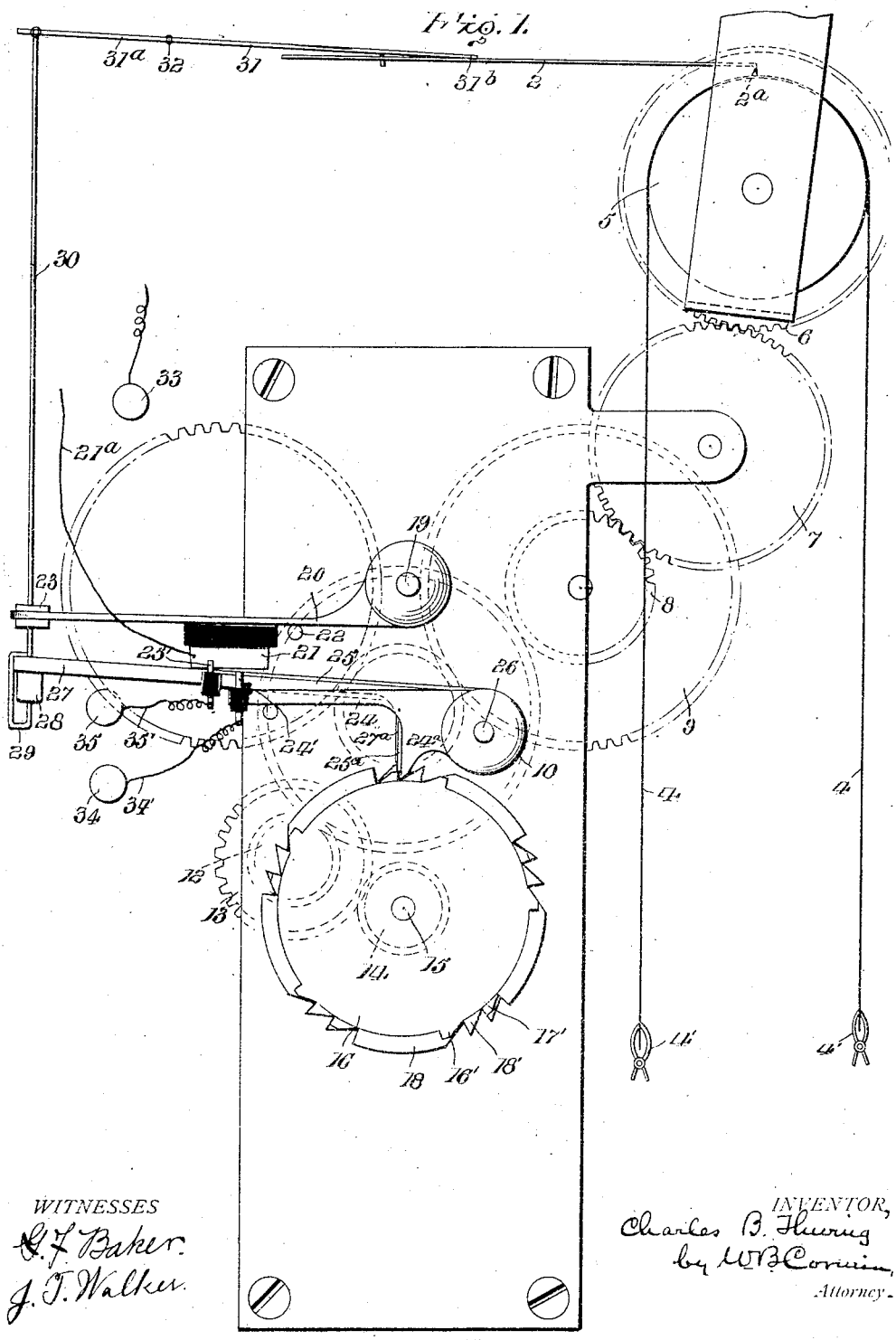

UNITED STATES PATENT OFFICE.

CHARLES B. THWING, OF PHILADELPHIA, PENNSYLVANIA, ASSIGNOR TO THWING INSTRUMENT COMPANY, OF PHILADELPHIA, PENNSYLVANIA, A CORPORATION OF PENNSYLVANIA.

GRAPHIC RECORDER.

1,046,680.

Specification of Letters Patent. Patented Dec. 10, 1912.

Application filed August 26, 1911. Serial No. 646,276.

*To all whom it may concern:*

Be it known that I, CHARLES B. THWING, a citizen of the United States, residing at Philadelphia, in the county of Philadelphia and State of Pennsylvania, have invented certain new and useful Improvements in Graphic Recorders, of which the following is a specification.

My invention relates to an improvement in graphic recorders, and it consists in a recorder which will facilitate the making on a single record sheet or chart of a plurality of records in frequent succession from a plurality of sources, these records being repeated so as to give essentially a continuous record of all the sources of energy. For example, if it be desired to record on a single chart the electric current consumed on a plurality of circuits, the several circuits will be automatically switched into the recorder in regular succession, my improvement providing a simple and practical method of making visible on the record chart which portions of the record were made by the current from each of the several electric circuits. In similar manner a number of pipes carrying fluids under pressure could be automatically and successively thrown into connection with a recording pressure gage.

The essential features of an instrument which is to give a graphic record of the variation of any measured quantity with the time consist of a registering element and a surface which receives the record made by the registering element, the latter of which moves in a given direction with the lapse of time, the former remaining in operative recording contact with the recording surface varying lengths of time accordingly as one or another source of energy is turned into the recorder. In such recording instruments, the receiving element, called hereinafter the chart, moves over equal intervals in equal times, sometimes continuously and sometimes by short steps with intervening intervals of rest. The recording element, hereinafter called the pen, may be depressed or otherwise caused to record on the chart at intervals, or it may be caused to remain continuously in contact with the chart.

I shall now describe my invention so that others skilled in the art to which it appertains may manufacture and use the same, reference being had to the accompanying drawings, forming part of this specification in which, Figure 1 is a face view of a recorder embodying my invention. Fig. 2 is a top plan view of the lower contact levers and of the depressor lever. Fig. 3 is a top plan view of the upper contact lever. Fig. 4 is a cross-section, on the line IV—IV of Fig. 1. Fig. 5 is a top plan view of a portion of the contact wheels and of the depressor wheel. Fig. 6 is a portion of a chart showing a record such as would be made by the recorder shown in Figs. 1 to 5.

Like symbols of reference indicate like parts in the several figures.

In the drawings, 2 indicates the needle or pen of any ordinary form of galvanometer (not shown), which needle or pen is adapted to be brought at regular intervals in recording contact with the chart 4, but is free during the time it is not in recording contact to move from side to side of the chart in accordance with the fluctuations of the current actuating the galvanometer. The chart 4 is held against the drum 5 and compelled to travel therewith by two counterbalancing weights 4'. This drum 5 is actuated and moved at a constant speed by a pinion 6, which in turn is operated by a pinion 7 of any suitable clock work mechanism. The pinion 7 meshes with the small pinion 8, on the shaft of which is mounted the pinion 9, and this pinion 9, through suitable pinions 10, 11, 12 and 13, drives at a constant rate of speed the pinion 14 upon the shaft 15 of which are fixedly mounted the contact wheels 16 and 17, and the depressor wheel 18, these wheels being provided with teeth 16', 17' and 18'.

Pivotally mounted on the pin 19 is the upper contact lever 20, carrying a contact 21, the lever 20 resting on a stop 22 and being held against the same by a weight 23 on the free end of the lever. The contact 21 is connected to the galvanometer by a wire 21$^a$. The lower contact levers 24 and 25 carrying the contacts 24' and 25' are pivotally mounted on a pin 26. A depressor lever 27 is also pivotally mounted on the pin 26. At its outer end the depressor lever 27 has a weight 28, which is adapted to slide up and down in a yoke 29, extending from the upper end of which is a rod 30 connected to one end 31ª of a depressor 31, pivoted at 32.

33 is a binding post to which is attached the wire leading out of the galvanometer, and 34 and 35 are the binding posts to which are connected the leading in wires of the two circuits, these binding posts being connected to the lower contacts 24' and 25' by wires 34' and 35'.

The operation of my improved recorder, shown in Figs. 1 to 5, is as follows: By means of the pinions 6 to 14, inclusive, of the clockwork mechanism, the drum 5 carrying the chart 4, the contact wheels 16 and 17, and the depressor wheel 18, are rotated in proper relation one to the other. The rotation of each of the contact wheels 16 and 17 will bring alternately the teeth 16' and 17' of the contact wheels 16 and 17, under the legs 24ª and 25ª of the contact levers 24 and 25, which movement will alternately raise said contact levers, carrying the contacts 24' and 25', and bring said contacts alternately against the contact 21, completing the galvanometer circuit and causing the galvanometer needle to move to a position to register the current passing through the instrument. Simultaneously with the bringing of either of the lower contacts 24' or 25' into electrical connection with the upper contact 21, the depressor lever 27, by reason of its leg 27ª coming into contact and riding up on the teeth 18' of the depressor wheel, is raised at its outer end against the top of the yoke 29, thereby raising the rod 30, which pressing upwardly against the end 31ª of the depressor 31, depresses the end 31ᵇ of said lever against the galvanometer needle 2 and brings its pen 2ª against and into recording engagement with the chart 4. Simultaneously with the dropping of either of the contact lever legs 24ª or 25ª from the teeth 16' or 17', thus breaking the galvanometer circuit, the depressor lever leg 27ª will drop from the apex of one tooth 18' into the bottom portion of another tooth which movement is made certain by the weight 28. The downward motion of the depressor lever 27 brings its weight 28 against the bottom of the yoke 29 carrying said yoke and with it the rod 30 downwardly and taking the end 31ᵇ of the depressor out of contact with the needle 2. Upon being relieved from pressure the needle will immediately spring upwardly and release its pen from recording engagement with the chart. The construction of the contact wheels 16 and 17 is such that the contact 25' is held in circuit with the contact 21 a greater length of time than the contact 24', and consequently a longer mark is made on the chart 4 by the pen 2ª when the former is in circuit than when the latter is. In this way the records on the chart of the two circuits are clearly distinguishable, as shown in Fig. 11. It will be readily apparent that the circuits may be increased as desired by merely increasing the contact wheels and contact levers to correspond with the number of circuits. The depressor wheel 17 would of course have to be changed accordingly.

The mechanical or automatic means employed in the construction just described for throwing the several sources of energy successively into connection with the recorder may be varied at pleasure, as may also the means used to vary the distance moved by the chart during any given interval of contact with the pen.

It will be understood that various changes may be made in the mechanical details of my improved recorder without sacrificing any of its advantages or departing from the spirit of the invention.

The advantages of my improvement will be readily apparent to those skilled in the art. My improved recorder is simple in construction, compact, and very reliable in operation.

I claim:—

1. In an automatic multiple recorder, the combination of a movable chart-carrying device, a recording instrument responding to a plurality of sources of energy, and means for varying the length of time of contact of said recording instrument with the chart accordingly as the recording instrument is connected to one or another of said sources of energy.

2. In an automatic multiple recorder, the combination of a uniformly moving chart-carrying device, a recording instrument responding to a plurality of sources of energy, and means for varying the length of time of contact of said instrument with the chart accordingly as the recording instrument is connected to one or another of said sources of energy.

3. In an automatic multiple recorder, the combination of a galvanometer, a chart-carrying device, a recording pen, a galvanometer contact, a plurality of contact levers carrying circuit contacts, and a plurality of contact wheels adapted to move said contact levers so as to bring said circuit contacts in succession into electrical connection with said galvanometer contact.

4. In an automatic multiple recorder, the combination of a galvanometer, a chart-carrying device, a recording pen, a galvanometer contact, a plurality of contact levers carrying circuit contacts, a plurality of contact wheels adapted to move said contact levers so as to bring said circuit contacts in succession into electrical connection with said galvanometer contact, a depressor for bringing the pen into recording engagement with the chart, a depressor lever for actuating the depressor, a depressor wheel for operating the depressor lever, and mechanism for moving the chart, contact wheels, and depressor wheel at suitable rates of speed.

In testimony whereof I affix my signature in presence of two witnesses.

CHARLES B. THWING.

Witnesses:
D. C. DRAPER,
A. J. WEISS.